(12) United States Patent
Eramian

(10) Patent No.: US 10,248,978 B2
(45) Date of Patent: Apr. 2, 2019

(54) SYSTEMS AND METHODS FOR GROUP SHOPPING WITH A SHARED SHOPPING LIST

(71) Applicant: PAYPAL, INC., San Jose, CA (US)

(72) Inventor: David Edward Eramian, Mountain View, CA (US)

(73) Assignee: PAYPAL, INC., San Jose, CA (US)

(*) Notice: Subject to any disclaimer, the term of this patent is extended or adjusted under 35 U.S.C. 154(b) by 559 days.

(21) Appl. No.: 14/266,679

(22) Filed: Apr. 30, 2014

(65) Prior Publication Data

US 2015/0317708 A1 Nov. 5, 2015

(51) Int. Cl.
*G06Q 30/00* (2012.01)
*G06Q 30/06* (2012.01)
(52) U.S. Cl.
CPC ......... *G06Q 30/06* (2013.01); *G06Q 30/0605* (2013.01); *G06Q 30/0633* (2013.01)
(58) Field of Classification Search
CPC .................................................... G06Q 30/00
See application file for complete search history.

(56) References Cited

U.S. PATENT DOCUMENTS

| | | | | |
|---|---|---|---|---|
| 6,463,273 B1 * | 10/2002 | Day | ..................... | G08B 27/003 340/539.28 |
| 6,912,507 B1 * | 6/2005 | Phillips | ............ | G06Q 10/06311 705/22 |
| 2003/0122857 A1 * | 7/2003 | Marion | .................... | G06F 3/147 715/700 |
| 2004/0093274 A1 * | 5/2004 | Vanska | .................. | G01C 21/20 705/26.7 |
| 2005/0177446 A1 * | 8/2005 | Hoblit | ..................... | G06Q 10/10 705/26.1 |
| 2005/0256781 A1 * | 11/2005 | Sands | .................. | G06Q 10/087 705/26.8 |
| 2008/0281712 A1 * | 11/2008 | Fuzell-Casey | ......... | G06Q 30/02 705/26.1 |

(Continued)

OTHER PUBLICATIONS

Caldbeck, R. (Feb. 28, 2014). In-Aisle Advertising Is Coming, and Consumer Brands Should Embrace It. <https://www.forbes.com/sites/ryancaldbeck/2014/02/27/in-aisle-advertising-is-coming-and-consumer-brands-should-embrace-it/#738439b22317> (Year: 2014).*

(Continued)

*Primary Examiner* — Abby J Flynn
(74) *Attorney, Agent, or Firm* — Haynes and Boone, LLP

(57) ABSTRACT

Systems and methods are provided for facilitating group shopping using a shared shopping list. A group such as a family having a shared shopping list may check in at a merchant location. The shared shopping list may be stored by a service provider or a payment provider. As the members of the group move around within the merchant location, one or more wireless beacons at the merchant location may communicate with user devices of the group members to track the locations of the group members. When a group member approaches or is close to an item on the shared shopping list, the user may be provided with an alert that they are nearby or approaching the location of the item. In some embodiments, directions to a list item or a related item such as a replacement item for an unavailable list item may be provided in the alert.

20 Claims, 8 Drawing Sheets

(56) References Cited

U.S. PATENT DOCUMENTS

| | | | | |
|---|---|---|---|---|
| 2009/0156190 | A1* | 6/2009 | Fisher | G06Q 40/02 |
| | | | | 455/418 |
| 2010/0287023 | A1* | 11/2010 | Knobel | G06Q 10/06 |
| | | | | 705/7.13 |
| 2011/0288906 | A1* | 11/2011 | Thomas | G06Q 30/02 |
| | | | | 705/7.29 |
| 2013/0103539 | A1* | 4/2013 | Abraham | G06Q 30/0633 |
| | | | | 705/26.8 |
| 2013/0268317 | A1* | 10/2013 | Mattila | G06Q 30/02 |
| | | | | 705/7.29 |
| 2014/0207615 | A1* | 7/2014 | Li | G06Q 30/0623 |
| | | | | 705/26.61 |
| 2014/0229248 | A1* | 8/2014 | McIntosh | G06Q 30/02 |
| | | | | 705/14.1 |
| 2015/0006308 | A1* | 1/2015 | Lin | G06Q 30/0633 |
| | | | | 705/26.2 |
| 2015/0019391 | A1* | 1/2015 | Kumar | G06Q 10/087 |
| | | | | 705/28 |

OTHER PUBLICATIONS

Perez, S. (Oct. 10, 2011). Aisle411 Partners With ZipList for Shopping Lists, Recipe Search. <https://techcrunch.com/2011/10/10/aisle411-partners-with-ziplist-for-shopping-lists-recipe-search/> (Year: 2011).*

* cited by examiner

SYSTEMS AND METHODS FOR GROUP SHOPPING WITH A SHARED SHOPPING LIST

TECHNICAL FIELD

The present invention generally relates to electronic commerce and, more particularly, to systems and methods for facilitating group shopping using a shared shopping list.

BACKGROUND

Groups of users such as families, groups of friends, coworkers or other groups often visit locations to engage in transactions. For example, a family will sometimes visit a grocery store together to shop for groceries and other household items. In some situations the family will shop together as a group. In other situations, the family will split up to separately obtain products to shorten the duration and increase the efficiency of a shopping trip. However, lacking any tools to help determine which member of the family will obtain which needed product or tools for helping to determine the locations of products, the desired increase in efficiency may be reduced or eliminated due to time spent searching for products and/or one or more family members obtaining duplicates of the same product.

It would therefore be desirable to be able to provide systems and methods for facilitating efficient group shopping.

Figure 1:
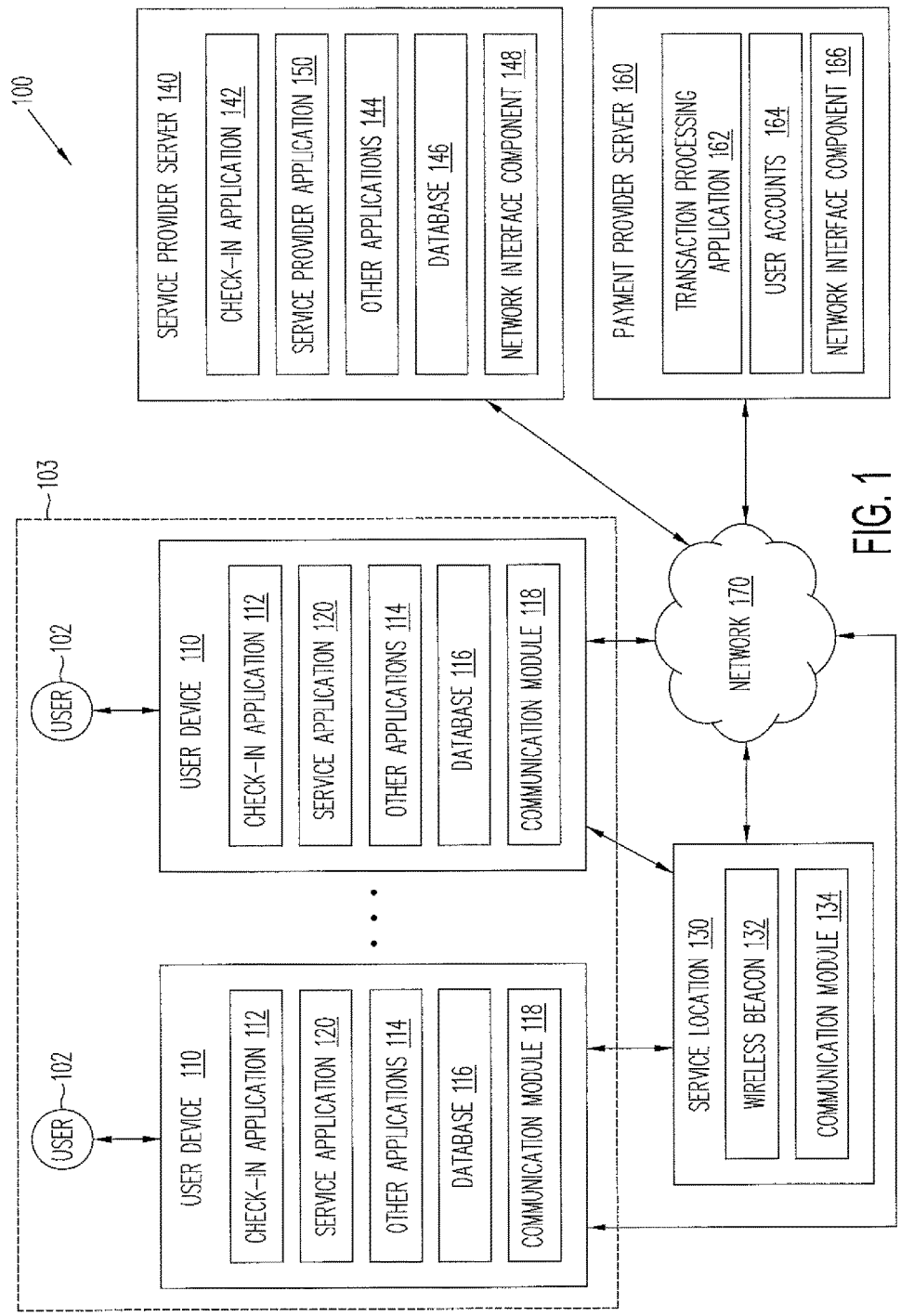
FIG. 1 is a block diagram of an illustrative networked system suitable for implementing group shopping processes, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various locations provide equipment for communications with a user device of a user at the location. The equipment may include wireless communications equipment such as short range wireless communications equipment or other wireless communications equipment. The equipment may sometimes be referred to as beacon equipment or beacons. Wireless communications equipment that may be included in a beacon at a location may include Bluetooth Low Energy (BLE) beacon communications equipment, wireless local area network equipment (e.g., WiFi based equipment), cellular network equipment, global positioning system (GPS) equipment, combined cellular and GPS equipment, other radio or microwave based communications equipment, infrared communications equipment and/or any combination thereof.

The beacons may communicate with the user device to alert users of check-in services, product locations, other product information and/or other products and services through their user device. The beacons may provide additional functionality, such as establishing a connection with a server entity to complete transactions including check-in services and/or shared shopping list management and alerts. Additionally, the beacons may provide communication services to the user device directly, including information stored on the beacons, and/or information from a device or server corresponding to the beacon. One or more beacons may be used to determine (e.g., by triangulation operations) the location of a user to within, as examples, less than one meter, less than 10 feet, less than five feet, less than two feet, or less than one foot.

A service provider may include one or more locations where the service provider offers goods, products, services, or other items to users. The service location(s) may utilize short range wireless beacons to communicate with mobile user devices of the users. The short range wireless beacons may employ, for example, BLE communications that emit a signal receivable by a user device. The communication may include an identifier for the beacon. A user device may passively monitor for beacon communications such as BLE communications. When a user device detects a beacon signal such as a BLE signal and verifies the identifier as belonging to a particular location such as a merchant location (e.g., a merchant device and/or server), both the user device and the beacon may ramp up in power and establish a connection. The connection may further enable the user device to communicate with a service provider device and/or server. The beacon may be connected to a networked device at the service location, or the beacon may include network functionality to communicate with the service provider server.

The service provider may utilize an identifier from each user device to determine a user history and/or other information for the associated user. Thus, each user may receive targeted assistance based on the user history and other information, such as information about the service location and/or service provider, offers for help, product offers, service offers, shopping lists generated by and/or for the user, and similar assistance or offers. For example, the service provider may store a shopping list for each user. When the user checks into a service location, the service provider may access the stored shopping list for that user and provide information associated with items such as products at the service location that are on the stored shopping list.

In some situations, a shopping list may be a shared shopping list that is common to more than one user. For example, a group of users such as a family may each have access to, may each be associated with, and/or may each contribute to a shared shopping list stored by the service provider.

When more than one user is checked into a service location, the user histories and/or other information of each user may be used to determine that a plurality of users that are checked in are associated with a common or shared shopping list. For example, an account of each checked-in user may be associated with the shopping list or one or more relationships between the checked-in users may be determined from which it can be determined that one or more of the checked-in users are associated with a shopping list of another one of the users. For example, all of the members of a family may be checked-in at a grocery store or other merchant location and may all be associated with a family shopping list or it may be determined that a first checked-in user is a child, spouse, friend, teammate, coworker or other associate of a second checked-in user that has a stored shopping list. Based on the determined relationship of the first user with the second user, the second user may be associated with the shopping list of the first user while the first and second users are at the merchant location. In some embodiments, the second user may be prompted to confirm that the second user can be associated with the shopping list prior to associating the second user with the shopping list based on the determined relationship in order to protect the privacy of the second user.

While the users are at the service location, the locations of individual users within the service location may be determined. The locations of products within the merchant location that are on the shared shopping list may also be determined. As the users move within the merchant location (together or separately), the locations of the users with respect to the locations of the products may be determined. When one or more users are nearby or approaching a location of a particular item on a shopping list, the user may be provided with an alert that they are nearby and/or approaching the location of the product to facilitate efficient shopping. In this way, specific items to purchase from a central or shared shopping list can be pushed to the user device of each member of a group so as to allow the group to more efficiently get through a shopping list and expedite the shopping process.

When a user obtains a product, that product may be removed from the central shopping list so that multiple users don't overlap efforts in obtaining the same item. If a product on the list is unavailable, one or more suggested replacement items may be determined and pushed to the user device of a user that is nearby or approaching the replacement item. The items that are pushed to a particular user may be filtered based on various factors such as age, parental controls, etc. so that, for example, a child walking through a grocery store may be alerted to pick up a loaf of bread for their parent, but will not be notified to pick up age inappropriate items such as alcohol or tobacco.

FIG. 1 is a block diagram of a networked system 100 suitable for implementing group shopping processes using a shared shopping list, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 may include one or more users 102, each having a user device 110, a service location 130, a service provider server 140, and a payment provider server 160 in communication over a network 170. Each user 102 (e.g., a visitor to a service location), may utilize their corresponding user device 110 to check-in to service provider server 140. Service location 130 may correspond to a location that provides goods, products, items, and/or other services to a user including food, beverage, household goods, gardening supplies, home repair supplies, clothing, books, movies, automotive supplies, electronics, sporting goods, furniture, travel, medical, or other products and/or services. Service provider server 140 may correspond to a general server for multiple service locations (e.g. a server for a merchant chain) or may be specific to only service location 130 (e.g. a server for a local merchant, a hospital, an airport, etc.).

Check-in of users 102 may be accomplished through a beacon 132 (e.g., a wireless beacon) at service location 130, through a social media application or website or by other check-in equipment. Once one or more users 102 are checked-in to service provider server 140, a group 103 of users that are associated with a common shopping list may be identified. A common shopping list may be a shared or sharable shopping list stored by service provider server 140, payment provider server 160, service location 130, and/or one or more user devices 110.

For example, payment provider server 160 may store shopping lists for users. Each shopping list may be associated with one or more users 102. Some shopping lists may be shared among a group of users 102. In some embodiments, a user history of each user 102 (e.g., a purchase history of the user or a visit history of the user at service location 130 or other services locations) or other user information may be determined for that user. The user history and/or other information of the users may be used to determine that one or more users 102 form a group such as group 103 that is associated with a common shopping list. Group 103 may be a family group, a group of friends, a couple, siblings, cousins, a sports team, a club, coworkers, an organization or other suitable group of people that are associated with a common shopping list. In some situations, some users 102 that are checked in at a common time at a common location with group 103 may not be associated with the common shopping list, but may be associated with one or more users 102 in the group 103 and may be added to group 103 based on the association with those users. Once a group 103 has been identified, the identified group may then receive alerts associated with items on the shared shopping list (e.g., a list of items such as products and/or services that one or more members of the group is considering or intends to purchase).

User devices 110, service location 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Each user device 110 may be implemented using any appropriate hardware and software such as hardware and software configured for wired and/or wireless communication with beacon 132 and service provider server 140. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although two users and two associated user devices are shown in FIG. 1, a group 103 may include any number of users each having one or more user devices. System 100 may include users and user devices that are independent of a group. Although only one group 103 is shown in FIG. 1, a plurality of groups such as group 103 may be included in system 100.

As shown in FIG. 1, each user device 110 may contain a check-in application 112, a service application 120, other applications 114, a database 116, and a communication module 118. Check-in application 112, service application 120, and other applications 114 may correspond to processes, procedures, and/or applications executable by a hardware processor, for example, a software program. In other embodiments, user device 110 may include additional or different software as required.

Check-in application 112 may be used by the user 102 of each user device 110 to establish a connection between that user device 110 and service provider server 140. Check-in application 112 may correspond to a specific application utilized by user device 110 with service provider server 140 to complete a check-in with service provider server 140. The check-in with service provider server 140 may correspond to a process to log in to a user account of user 102 with service provider server 140. In other embodiments, the check-in may provide and/or verify an identity of user 102, including transmission of an identifier for user 102 and/or user device 110. The check-in may be completed over network 170 with service provider server 140. In such embodiments, check-in application 112 may correspond more generally to a browser application configured to communicate with service provider server 140.

Check-in application 112 may also correspond to an application available over the Internet for download from service provider server 140 and/or other server corresponding to service location 130. Check-in application 112 may be utilize communications module 118 to exchange short range wireless communications with beacon 132 at service location 130 to complete a check-in process. For example, service location 130 may include infrastructure with beacon 132 to communicate with user device 110 and complete the check-in process with service provider server 140. Beacon 132 may be configured to transmit an identifier for reception by user device 110.

Check-in application 112 may execute in the background of an operating system of each user device 110 and be configured to establish connections, using communication module 118 of that user device 110, with one or more beacons 132 (e.g., wireless beacons) at service location 130. The connection may be established with or without user input from user 102. For example, beacon 132 may broadcast a token, such as a universally unique identifier (UUID), for reception by check-in application 112. Check-in application 112 may utilize communication module 118 of the user device 110 to receive the token from beacon 132. If check-in application 112 acknowledges the UUID as identifying service location 130, beacon 132, and/or service provider server 140, check-in application 112 may transmit an identifier corresponding to a user 102 and/or a user device 110 back to beacon 132. Check-in application 112 may utilize communication module 118 to communicate with beacon 132 (e.g., over near field communication, Bluetooth, Bluetooth Low Energy, radio, infrared, WiFi, cellular, GPS, combined cellular and GPS, microwave, a combination thereof, or other connection). The identifier from each user device 110 may include, be transmitted with, concatenated with, or otherwise bundled with the identifier received from beacon 132.

Once a connection is established with beacon 132, each user device 110 may be checked-in with service provider server 140 if the user 102 of that device has not previously been checked-in. The check-in process may then associate that user 102 with the beacon 132 used to check-in that user 102 and/or other wireless beacons at the service location. In such embodiments, check-in application 112 of each user device 110 may utilize short range wireless communication with beacon 132, such as near field communication, Bluetooth, Bluetooth Low Energy, radio, infrared, WiFi, cellular, GPS, combined cellular and GPS, microwave, a combination thereof, or other connection. Where beacon 132 corresponds generally to service location 130 or a location in or around service location 130, each user 102 may be associated with service location 130 or a particular location in or around service location 130. However, in other embodiments beacon 132 may correspond to a location, a location of an item (e.g., a product or good), and/or a location of a service at service location 130. Thus, each user 102 may be associated with that location, item, and/or service (e.g., a television sales section of a merchant, a location near or approaching a particular product, etc.).

Check-in application 112 may receive information from service provider server 140. For example, check-in application 112 may receive information, shopping lists, maps, processes to request assistance from the service provider, etc. The information that is passed to check-in application 112 may be generally based on service location 130, such as a map of a store or other merchant location, a portion of a shopping list that includes products and/or services that are offered for sale at service location 130 or other information about and/or associated with service location 130. Additionally, the service provider server 140 may determine a user history and/or other user information corresponding to each user 102 from a user identifier transmitted to service provider server 140 during the check-in process. Thus, the information may be transmitted to user 102 based on the user history and/or the other user information. When a user 102 is checked-in with service provider server 140, service provider server 140 may have an identifier of user device 110 and transmit the information to user device 110 using that identifier over network 170 and/or through one of beacon 132.

Check-in application 112 may utilize communication module 118 to pass user information to service provider server 140, including user assistance preferences, user calendar information, user relationship information, user email information, user social media information, user group membership information, user family information, user team information, user shopping list information, identifiers of user 102 and/or user device 110, a request for assistance, a request for a type of assistance, product preference information, service preference information, etc. Once check-in application 112 of each user device of group 103 has completed a connection with service provider server 140, the group may be recognized or identified by service provider server 140 and group 103 may receive targeted assistance such as alerts of nearby items on a common shopping list of group 103.

Service application 120 may be used, for example, to provide a convenient interface to permit users 102 (e.g., members of group 103) to receive, request, and/or view targeted products and/or services. Service application 120 may correspond to an application specific to service location 130 and/or service provider server 140, such as an application downloadable over network 170 and/or through beacon 132. However, in other embodiments, service application 120 may correspond more generally to any application configured to receive targeted assistance, product offers, list item alerts, and/or service offers, including a browser application.

Service application 120 may be configured to receive information such as assistance information, list item alerts, product offers, and/or service offers for service location 130. Service application 120 may also be configured to display the information. For example, service application 120 may display information for service location 130, such as an alert associated with a nearby item on a shopping list, a map, merchant store offerings, group-specific product or service locations, information desk locations, sales/coupons/rebates, or other general information. Additionally, service application 120 may use a location device and/or application of user device 110, such as a GPS device and application in addition to or in place of beacon communications, to locate users 102 of group 103 at a specific locations at and/or around service location 130, and transmit the specific location to service provider server 140 for use in providing the targeted assistance, list item alerts, product offers and/or service offers. In other embodiments, the locations of users 102 in group 103 may be determined based on a check-in of user device 110 with various wireless beacons such as beacon 132 at various locations in and/or around service location 130.

Targeted assistance, list item alerts, products, and/or services may be provided to users 102 (e.g., users 102 of group 103) using a user device 110 of the user, and/or face to face by a salesperson, concierge, or other employee of service location 130 and may be provided in a preferred language of a user 102 or group 103 or according other individual and/or group preferences or attributes. Service preferences such as alert preferences and/or replacement product preferences (e.g., preferences for suggestions for products to replace unavailable products such as preferences for generic products or brand name products) may be provided by one or more of users 102 (e.g., through typing in a preference request or selection of available preferences from a list) or may be learned by service application 120 or service provider server 140. Service application 120 may also receive individual and/or group preference and/or group membership information by scraping one or more online accounts of users 102 (e.g., a social networking account, a microblogging account, a user account with another service provider, etc.).

In various embodiments, check-in application 112 and service application 120 may be incorporated in the same application so as to provide their respective features in one convenient application interface.

Each user device 110 may include other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may include browser and/or mapping applications where the functions are not provided by check-in application 112 and/or service application 120. Other applications 114 may contain software programs, executable by a processor, including a graphical user interface (GUI) configured to provide an interface to the user.

Each user device 110 may further include memory such as database 116 which may include, for example, identifiers such as operating system registry entries, cookies associated with check-in application 112, service application 120, and/or other applications 114, identifiers associated with hardware of user device 110, or other appropriate identifiers, such as identifiers used for payment/user/device authentication or identification. Database 116 may include user device tokens and/or encryption keys, including a public key of service location 130 and/or service provider server 140 for beacon 132. Database 116 may include identifying information for tokens enabling check-in application 112 to identify beacon 132 when receiving a corresponding token. In one embodiment, identifiers in database 116 may be used to associate user device 110 with a particular account maintained by the account provider. Database 116 may further include online account access information and/or shopping list information.

Each user device 110 may include a communication module 118 adapted to communicate with beacon 132, service provider server 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, WiFi, cellular, GPS, combined cellular and GPS, microwave, near field communication devices, and/or a combination thereof. Communication module 118 may communicate directly with beacon 132 without network 170 using short range wireless communications.

Service location 130 may correspond to a physical location visited by group 103 that offers targeted assistance, group shopping assistance using a shared shopping list and user and product location tracking, targeted products, and/or targets services to group 103. For example, service location 130 may, according to various embodiments, correspond to merchant storefronts, shopping malls, amusement parks, concert halls, sports arenas, museums, hospitals, airports, train stations, etc. Service location 130 may include a plurality of locations within service location 130, where each location includes a beacon such as a wireless beacon. For example, a location in service location 130 may correspond to an area of a store offering video games, produce, baked goods, furniture, or other products for sale.

Beacon 132 may check-in each user when the user device 110 of that user is in proximity to beacon 132. Thus, beacon 132 enable service provider server 140 to associate a particular user 102 with service location 130 and/or a location within service location 130. Service location 130 may include a beacon 132 and a communication module 134. In other embodiments, service location 130 may include additional or different software and devices as required.

Beacon 132 may be maintained, for example, by service location 130 and service provider server 140. Beacon 132 may be implemented using any appropriate hardware and software configured for wireless communication with user device 110. For example, in one embodiment, beacon 132 may be implemented as a dongle device including a hardware processor and a communication module, for example, connected to device at service location 130. Thus, beacon 132 may be implemented as a device incorporated within or attached to a personal computer (PC), a smart phone, personal digital assistant (PDA), laptop computer, and/or other types of computing devices capable of transmitting and/or receiving data, such as an IPAD® from APPLE®. Beacon 132 may also act as a stand-alone device including a processor, communication module, and/or network interface component configured to communicate with user device 110 and/or service provider server 140. Although a single beacon is described, a plurality of beacons may be utilized and be location specific within service location 130, as previous discussed.

Beacon 132 of FIG. 1 may include processes, procedures, and/or applications executable by a hardware processor, for example, a software program, configured to interact with user devices 110. Beacon 132 may include applications for transmitting requests to establish a connection between a user device and beacon 132. Thus, beacon 132 may utilize a low energy short range wireless communication of beacon 132 to transmit requests to establish a connection with user devices 110, including an identifier such as a Universally Unique Identifier (UUID). If user devices 110 receive a request to establish the connection with beacon 132 and respond with a user device identifier (potentially including the UUID and other information to effectuate a check-in of each user device 110), beacon 132 may ramp up in power and create a connection between user devices 110 and beacon 132.

Beacon 132 may transmit the request to establish the connection with beacon 132 as a short range communication (e.g. a BLE protocol communication) including a "wake up" process for check-in applications 112 of user devices 110 and/or a token for beacon 132 or service provider server 140. In other embodiments, the request and/or connection may utilize near field communication, radio communication, infrared communication, or Bluetooth communication, BLE communication, WiFi communication, cellular communication, GPS communication, microwave communication, and/or any suitable combination thereof. The request may be specific to each user device 110 by including information that is specific to the corresponding user 102 or a group of users, such as a name, identifier, or user device identifier. The information specific to user 102 or a group of users may be determined from user accounts of users 102 or other information previously provided to service provider server 140. Thus, in certain embodiments, only one or more specific user devices 110 will pick up and authenticate the request.

After beacon 132 receives user device identifiers from user devices 110 of users in group 103, beacon 132 may determine that group 103 is at or in proximity to service location 130. Beacon 132 may pass the user device identifiers or an associated group identifier to service provider server 140 to complete the check-in process and associate group 103 with service location 130. As shown in FIG. 1, beacon 132 utilizes communication module 134 to pass the information to service provider server 140. However, in other embodiments, beacon 132 may utilize a network connection of beacon 132 through a communication module of beacon 132. Additionally, beacon 132 may keep a communication channel open between user devices 110 and service provider server 140 for passing additional information, such as assistance requests, list item alerts, assistance preferences, product and/or service offers, transaction information, payment information, and/or identification information.

In various embodiments, service location 130 includes at least one communication module 134 adapted to communicate with user devices 110, service provider server 140, and/or payment provider server 160. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof. Communication module 134 may communicate directly with user device 110 without network 170 using short range wireless communications.

Service provider server 140 may be maintained, for example, by a service location including one or a plurality of service locations. Generally, service provider server 140 may be maintained by anyone or any entity that establishes and/or maintains a location with services and/or products offered to users. In this regard, service provider server 140 may include one or more applications, which may be configured to interact with user devices 110 and/or service location 130 to complete check-in processes for user devices 110. Although only one service provider server is shown, a plurality of service provider servers may be utilized. In various embodiments, the check-in and assistance features of service provider server 140 may also be offered by payment provider server 160. Thus, all or part of the described features and processes of service provider server 140 may be incorporated within payment provider server 160.

Service provider server 140 may include a check-in application 142, a service provider application 150, a database 146, and a network interface component 148. Check-in application 142 and service provider application 150 may correspond to processes, procedures, and/or applications executable by a hardware processor, for example, a software program. In other embodiments, service provider server 140 may include additional or different software as required.

Check-in application 142 may correspond to processes to complete check-in with user devices 110. Thus, check-in application 142 may correspond to the server side application of service provider server 140 configured to transmit and/or receive check-in requests from user devices 110 and complete the check-in requests. A check-in request may include log-in information for a user account in database 146. Check-in may be completed by verifying the account information. However, in embodiments where a user account has not been previously established by user 102 and/or service provider server 140 does not offer user account services, check-in application 142 may receive other information for identifying users 102 and/or group 103, such as user names/identifiers, user device identifiers, group identifiers, an identifier for an account with another server (e.g., a payment account/payment account identifier with payment provider server 160), or other information.

Once check-in is completed between group 103 and service provider server 140, check-in application 142 may be utilized to associate various users 102 of group 103 with a various specific locations corresponding to various beacons 132, such as service location 130 generally, or a sub-location of service location 130 corresponding to a beacon 132, a product, and/or a service. Additionally, check-in application 142 may check group 103 and/or individual users 102 out of the location when group 103 or one or more users 102 of the group leaves the proximity of beacon 132. For example, when group 103 leaves the proximity of beacon 132 so that one or more user devices 110 of the group members are no longer in communication with beacon 132, group 103 may be checked-out of the location associated with that beacon.

Check-in application 142 may receive user identifiers from user devices 110 and/or a group identifier of group 103. The user identifiers may be utilized to check-in group 103. Additionally, the user identifiers may be passed to service provider application 150 to determine and provide targeted assistance, list item alerts, product and/or services to group 103.

Service provider server 140 further includes service provider application 150 configured to receive information corresponding to users 102 (e.g., users 102 of group 103) that are checked-in to beacon 132 through service location 130 and provide targeted assistance, list item alerts, products and/or services to users 102 of group 103.

Check-in information may correspond to one or more user accounts of users 102 (e.g., users 102 in group 103) with another server, such as payment provider server 160. In such embodiments, service provider server 140 may determine a shopping list, a user history and/or a group history from information received from payment provider server 160. Payment provider server 160 may provide information about previous purchases/visits by users 102 and/or group 103 at the same or similar locations to service location 130 or may provide other information.

In various embodiments, service provider server 140 may include other applications 144 as may be desired in particular embodiments to provide features to service provider server 140. For example, other applications 144 may include security applications for implementing server-side security features, programmatic server applications for interfacing with appropriate application programming interfaces (APIs) over network 170, or other types of applications. Other applications 144 may contain software programs, executable by a processor, including a graphical user interface (GUI), configured to provide an interface to a user.

Service provider server 140 may include a database 146 which may include, for example, identifiers such as operating system registry entries, cookies associated with check-in application 142 and/or service provider application 150, identifiers associated with hardware of service provider server 140, or other appropriate identifiers, such as identifiers used for payment/user/device authentication or identification. Database 146 may include identifiers and/or user accounts of user 102, which may comprise an identifier for users 102, group 103, and/or user devices 110. In various embodiments, identifiers in database 146 may be used by a payment/credit provider, such as payment provider server 160, to associate users 102 and/or group 103 with a particular account maintained by payment provider server 160. For example, an identifier for a payment account with payment provider server 160 may be stored with a user account, group account, shopping list, identifier of group 103, and/or identifiers of users 102 in database 146. In other embodiments, a user account stored in database 146 may include a shared identifier with the payment account with payment provider server 160.

In various embodiments, service provider server 140 includes at least one network interface component 148 adapted to communicate with user devices 110, service location 130, and/or payment provider server 160 over network 170. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof.

Payment provider server 160 may be maintained, for example, by an online payment service provider, which may provide user account and payment services on behalf of users 102, group 103 and other users. In this regard, payment provider server 160 includes one or more processing applications, which may provide payment for items using a user account with payment provider server 160. In one example, payment provider server 160 may be provided by PAYPAL®, Inc. of San Jose, Calif., USA. However, in other embodiments, payment provider server 160 may be maintained by or include a merchant, financial services provider, and/or other service provider, which may provide user account services to user 102. Although payment provider server 160 is described as separate from service provider server 140, it is understood that payment provider server 160 may include services offered by service provider server 140 and vice versa.

Payment provider server 160 of FIG. 1 may include a transaction processing application 162, a database of user accounts 164, and a network interface component 166. Transaction processing application 162 may correspond to processes, procedures, and/or applications executable by a hardware processor, for example, a software program. In other embodiments, payment provider server 160 may include additional or different software as required.

Transaction processing application 162 may be configured to receive information from one or more user devices 110 and/or service provider server 140 for processing and completion of financial transactions. Transaction processing application 162 may include one or more applications to process financial transactions between user devices 110 and/or service provider server 140. Financial transactions may include financial information corresponding to user debit/credit card information, checking account information, a user account (e.g., payment account with payment provider server 160), or other payment information. Transaction processing application 162 may complete the financial transaction for the purchase request by providing payment to service provider server 140. In various embodiments, transaction processing application 162 may provide transaction histories, including receipts, to user devices 110 in order to provide proof of purchase for an item and/or service. Transaction processing application 162 may also provide the transaction histories to service location 130 for use in pick-up/delivery of the item and/or service.

Additionally, payment provider server 160 includes user accounts 164. As previously discussed, users 102 and/or group 103 may establish one or more user accounts and/or group accounts with payment provider server 160. User accounts 164 may include user information, such as name, address, birthdate, payment/funding information, additional user financial information, shopping lists, and/or other desired user data. Information in user account 164 may be utilized by service provider server 140 to determine and provide targeted assistance, product offers, list item alerts, and/or service offers to group 103

In various embodiments, payment provider server 160 may include at least one network interface component 166 adapted to communicate with user device 110, service location 130, and/or service provider server 140 over network 170. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), infrared (IR), BLE, cellular, GPS, combined cellular and GPS, microwave, and/or near field communication devices, and/or any combination thereof.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
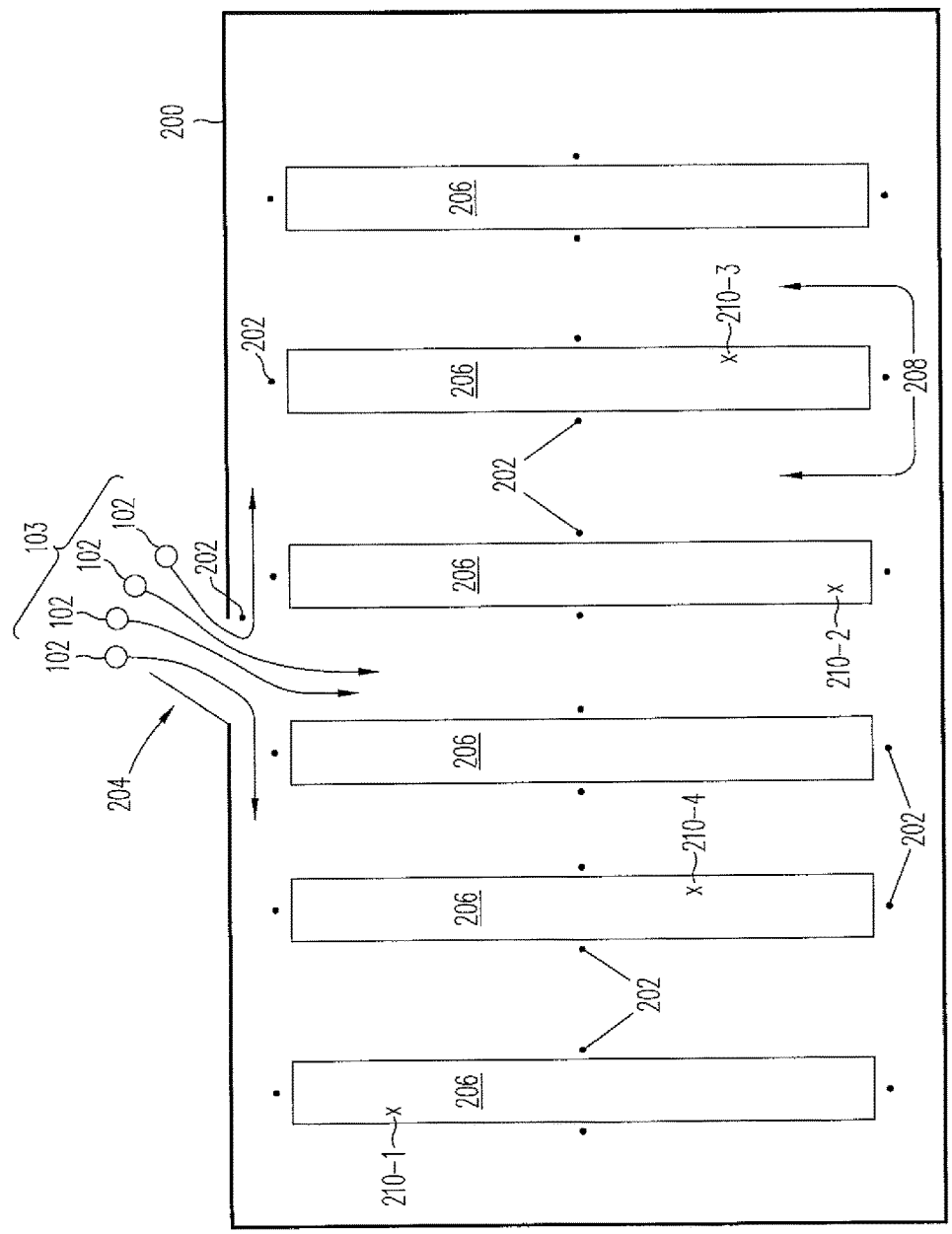
FIG. 2 is a diagram of an illustrative merchant location having beacons, according to an embodiment.

FIG. 2 is a top view diagram of an exemplary service location such as a merchant location having beacons. As shown in FIG. 2, a merchant location 200 (e.g., a physical store of a merchant) may include one or more beacons 202. Each beacon 202 may be an implementation of a wireless beacon such as beacon 132 of FIG. 1.

Beacons 202 of merchant location 200 may include a beacon 202 located at an entrance 204 of the merchant location and/or one or more beacons 202 at other locations in and/or around merchant location 200. In the example, of FIG. 2, merchant location 200 includes beacons 202 located at the ends of each row of shelves 206 and within each aisle 208 between the shelves 206. It should be understood by one of ordinary skill in the art that this arrangement of merchant location 200 and the arrangement of beacons 202 within merchant location 200 is merely illustrative. In general a merchant location may include shelves, no shelves, aisles, no aisles, or other dividing or arranging structures and may include any suitable number and distribution of wireless beacons in and/or around the merchant location for tracking, detecting, or otherwise determining the locations of users such as users 102 in or around the merchant location.

Merchant location 200 may include various products such as products 210 (e.g., products 210-1, 210-2, 210-3, and 210-4) at various locations in or around the merchant location (e.g., on shelves 206). Some or all of products 210-1, 210-2, 210-3, and 210-4 may be products that are listed on a common shopping list of group 103.

As shown in FIG. 2, a group 103 of users 102 may enter merchant location 200 through an entrance 204 such as a doorway. Users 102 may of group 103 may remain together within merchant location 200 or may separate once inside merchant location 200 (e.g., in order to each obtain a subset of items on a shopping list that is common to the group).

As users 102 enter merchant location, a beacon 202 located at or near the entrance may communicate with user devices of users 102 to check the users 102 and/or group 103 into the merchant location. When one or more users 102 of group 103 are checked into the merchant location, a shared shopping list for the group may be obtained (e.g., from a database associated with a service provider server, payment provider server, or from one of the user devices of the users). The shared shopping list may be provided partially or completely to each user 102 or users 102 may proceed to move about merchant location 200 without receiving a shopping list.

Figure 3:
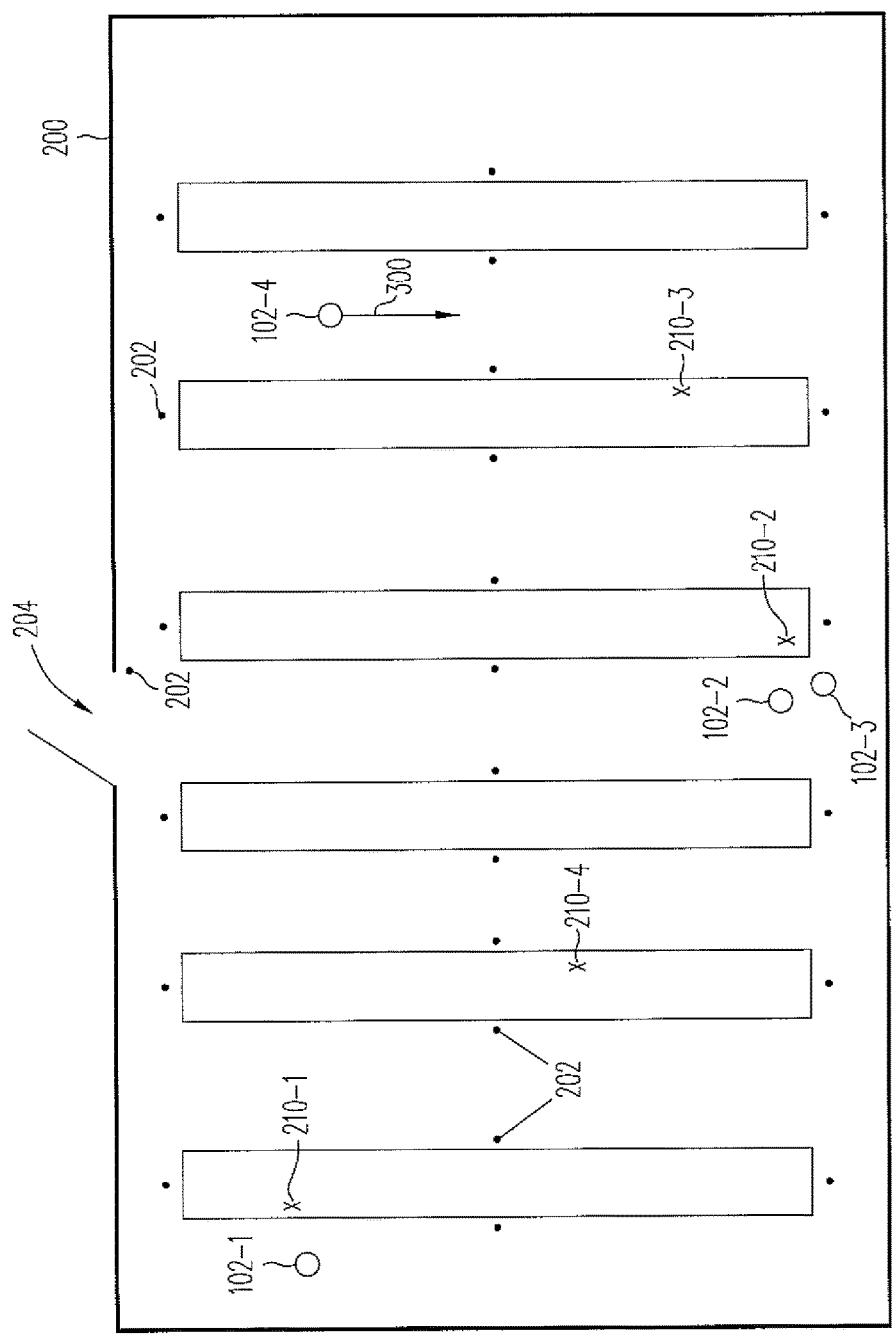
FIG. 3 is a diagram of an illustrative merchant location having beacons showing how the beacons may be used to determine the locations of members of a group at the merchant location relative to products at the merchant location, according to an embodiment.

FIG. 3 shows merchant location 200 after users 102 have split up and moved to various locations within merchant location 200. As shown, a first user such as user 102-1 may be located in proximity to product 210-1, second and third users such as users 102-2 and 102-3 may be located in proximity to product 210-2 and a fourth user such as user 102-4 may be moving in a direction 300 toward product 210-3. Based on communications between the beacons 202 and user devices of users 102-1, 102-2, 102-3, and 102-4, the relative locations of the users and the products may be determined. Based on the determined relative locations, user 102-1 may be provided with an alert that product 210-1 is nearby, one or both of users 102-2 and 102-3 may be provided with an alert that product 210-2 is nearby, and user 102-4 may be provided with an alert that product 210-3 is straight ahead.

In this way, each user may be alerted to products in a portion of the merchant location associated with that user so that time is not wasted searching and/or traversing the store to find desired products.

When a user obtains a product (e.g., if user 102-4 proceeds in direction 300 and removes product 210-3 from a shelf 206), that product may be removed from the common shopping list of group 103 so that other users (e.g., users 102-1, 102-2, and 102-3) know that that item has been obtained and do not spend time obtaining the same items. The obtaining of the item (e.g., the removal of the product from the shelf) may be determined in any suitable manner. For example, movement of the item may be detected using beacons 202, the user may scan a bar code or other code on the product using their user device, or the user may delete the item from the shared shopping list using an application on their user device.

Figure 4:
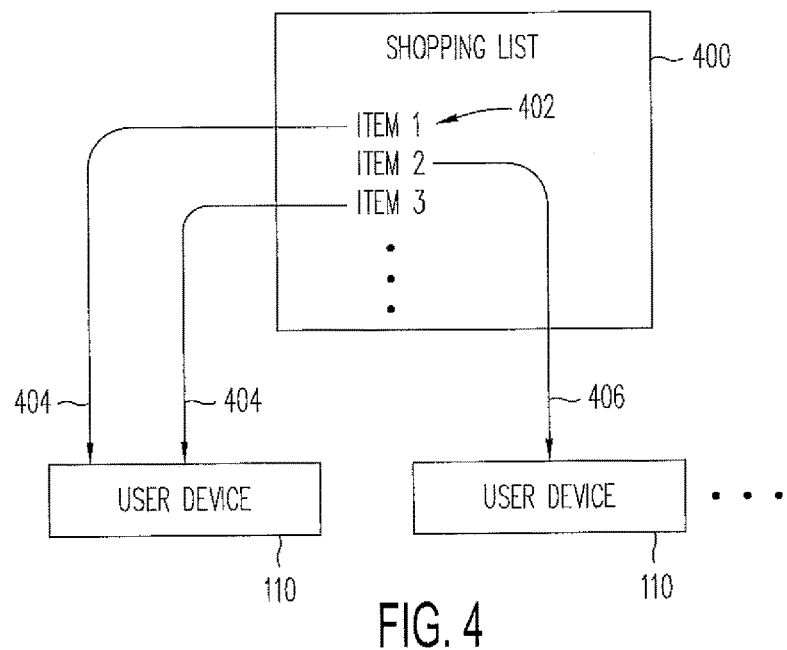
FIG. 4 is an illustrative diagram showing how items on a shared shopping list may be pushed to one or more user devices, according to an embodiment.

FIG. 4 is a diagram of a shared shopping list of one or more users, according to an embodiment. As shown in FIG. 4, a shopping list such as shopping list 400 may include one or more items 402 such as ITEM 1, ITEM 2, ITEM 3, etc. Each item 402 may be a product or a service that is offered for sale by one or more merchants. Shopping list 400 may be a list associated with a particular merchant or may be a shopping list including items to be obtained by various merchants.

While shopping at a merchant location, users having user devices 110 may each receive one or more items from list 400 based, for example, on the proximity and/or motion of each user relative to the location of a listed item 402 at the merchant location. In the example of FIG. 4, a first user device 110 receives ITEM 1 and ITEM 3 (as indicated by arrows 404) and a second user device 110 receives ITEM 2 (as indicated by arrow 406). In general any suitable number of user devices can receive any items 402 depending on the relative locations of the user devices to products corresponding to the items 402 while the user devices 110 are moved (e.g., along with associated users) at a merchant location.

List 400 may be stored by a merchant server (e.g., a service provider server), a payment provider server or by one of user devices 110 in a way that list 400 is accessible and editable by one or more of the merchant server, the payment provider server, and/or the user devices. Editing list 400 may include adding desired items for purchase to the list, moving listed items back and forth between the stored list and the user devices as the user's location changes, and/or removing obtained and/or purchased items from the list.

List 400 may be generated automatically by a service provider server or a payment provider server (e.g., based on a previously generated list, repeat purchase items for a group, and/or recommended items based on user histories or other information) or may be a user-generated list. One or more members of a group that shares a common shopping list may add, edit, and/or remove items from list 400.

Figure 5:
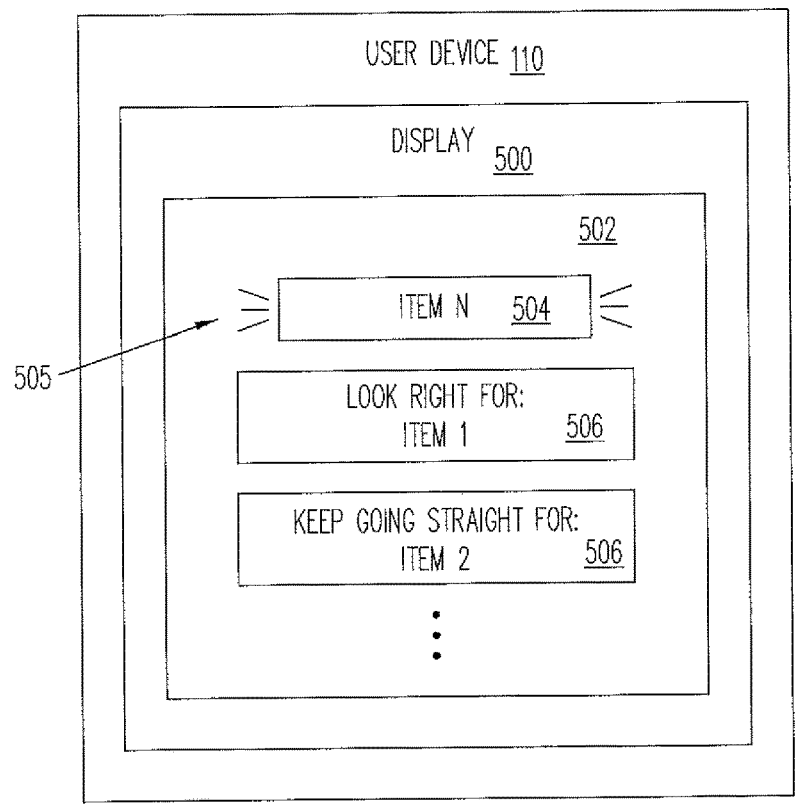
FIG. 5 is a block diagram of an illustrative user device showing how a display of the user device may be used to provide alerts to a user regarding products at a merchant location that the user is nearby or approaching, according to an embodiment.

FIG. 5 shows an example of a user device having list item alerts on a display of the user device. As shown in FIG. 5, display 500 may be used provide a user with an application window 502 within which one or more alerts such as list items alerts 504 and 506 may be provided. List item alerts such as list item alerts 504 and 506 may be provided in an application window as shown or may be provided as individual alert windows as desired.

As shown, list item alerts provided to a user may include a proximity alert 504 for an Nth item (e.g., ITEM N) on a shopping list such as a shared shopping list. Proximity alert 504 may be provided when the user of user device 110 is nearby or in close proximity (e.g., within arm's reach, within one foot, within two feet, within five feet, within 10 feet, or other suitable proximity) to the product corresponding to ITEM N (e.g., as determined by one or more wireless beacons at a merchant location), and may be provided with enhancements 505 to alert the user that they have arrived at the location of ITEM N. Enhancements 505 may be a pattern such as a glow or shadow, moving images such as a flashing alert, or may include other enhancements such as an audible alert or a vibration.

As shown in FIG. 5, list item alerts that may be provided to a user may include alerts 506 for items that the user is approaching. The user may be determined to be approaching an item when the user is moving toward the item and within, for example, ten meters of the item, within ten feet of the item, and/or within the same isle or section as the item). Alerts 506 may include directions to particular products such as "LOOK RIGHT FOR: ITEM 1" or "KEEP GOING STRAIGHT FOR: ITEM 2". In this way, the orientation and/or the direction of motion of the user (e.g., as determined using positioning components of the user device and/or Wireless beacon communications) can be used to assist the user in obtaining products corresponding to items on a shared list. List item alerts such as alerts 504 and 506 may be provided to one or more members of a shopping group based on the relative locations of the members to products corresponding to items on a shared shopping list of the group. If user moves away from an item for which an alert has been provided without obtaining the item, the alert may be removed from the user device.

Figure 6:
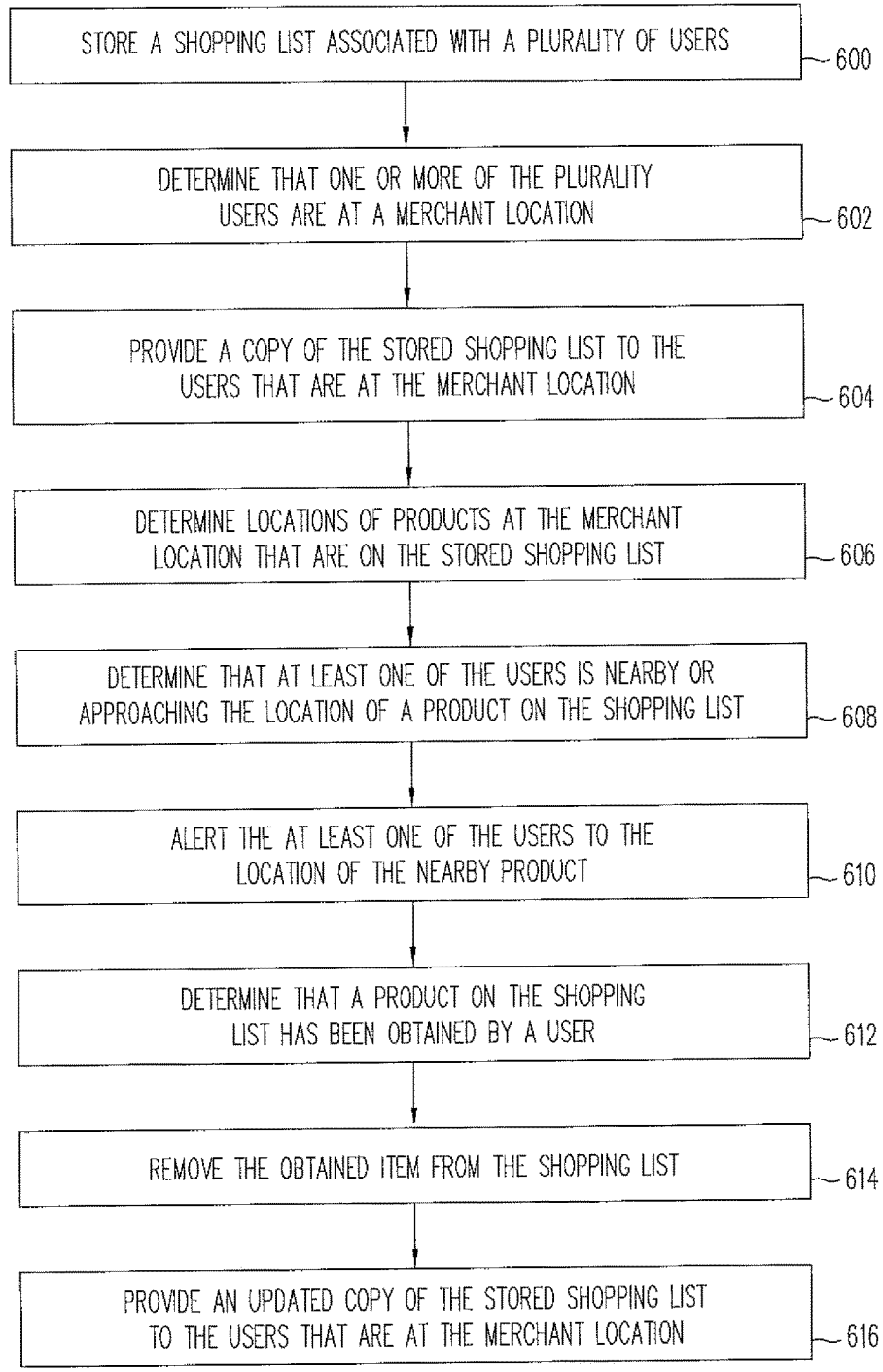
FIG. 6 is a flowchart of an exemplary process for providing efficient group shopping using a shared shopping list, according to an embodiment.

FIG. 6 is a flowchart of an exemplary process to provide location-based shopping assistance to one or more members of a group associated with a shopping list such as a shared shopping list, according to an embodiment.

At step 600, a shopping list such as a shared shopping list may be stored (e.g., at a service provider server, a payment provider server and/or a user device). The shopping list may be a shared shopping list of a plurality of users of a networked system of the type shown in, for example, FIG. 1.

At step 602, it may be determined that one or more of the plurality of users are at a merchant location. Determining that the plurality of users are at the merchant location may include receiving check-in information from one or more of the plurality of users at the merchant location (e.g., a service center location). Check-in information from each user may include at least a user identifier for that user. The check-in information from each user may be provided through a social media application or website or may be received from a beacon corresponding to the location (e.g., a beacon at the entrance to the location) when a user device of that user is in communication with the beacon. The user device may be in communication with the beacon when the user device is in proximity to the beacon. The user device and the beacon may be in communication using one of near field communication, radio communication, infrared communication, Bluetooth communication, and Bluetooth low energy communication, cellular communication, GPS communication, combined cellular and GPS communication, microwave communication, and/or near field communication, and/or any combination thereof. The check-in information may be received from each of the plurality of users when that user arrives at the location.

At step 604, a copy of the stored shopping list may optionally be provided to the users that are at the merchant location. The shopping list may be provided as a whole to each of the users at the merchant location or various portions of the shopping list may be provided to various users based on the locations of the various users and the proximity of the users to the listed items on the shopping list. The shopping list may be provided to the user device of each user at the location. In some embodiments, some or all of the shopping list may be provided to users at other locations.

At step 606, the locations of one or more products at the merchant location that are (listed) on the stored shopping list may be determined. The locations of the products may be determined based on previously stored locations and/or the locations of the products may be actively determined (e.g., using wireless beacons and communications circuitry attached to each product and/or to a shelf known to contain a product).

At step 608, it may be determined that at least one of the users is nearby or approaching the location of a product on the shopping list. For example, a child of a family at a grocery store may be standing in the dairy section of the grocery store proximate the location of milk that is on a shared shopping list of the child and the parents of the child. One or more wireless beacons in communication with a mobile device of the child may determine that the child is nearby the milk. In another example, one or both of the child's parents may be walking down an aisle of the grocery store toward an automotive section of the grocery store. One or more wireless beacons in communication with mobile devices of one or both of the parents may determine that one or both of the parents are approaching motor oil that is on the shared shopping list.

The user may be determined to be nearby the location of the product when the user is within arm's reach of the product, within one foot of the product, within two feet of the product, within five feet of the product, within 10 feet of the product, or other suitable proximity of the product. A user may be provided with the ability to set the distance from a product within which a nearby product alert may be provided or the distance may be automatically determined. The user may be determined to be approaching the location of the product when the user is determined to be moving toward the product and to be within ten feet of the product, within ten meters of the product, within 100 feet of the product, or in the same section or aisle of a store as the product. A user may be provided with the ability to set the distance from a product within which an approaching product alert may be provided or the distance may be automatically determined.

At step 610, the at least one of the users may be alerted to the nearby (or approaching) product. For example, the child may receive an alert on their mobile device to pick up the milk located nearby. As another example, one or both parents may receive an alert on their mobile device that they are approaching the motor oil. If desired, the alert may be for a branded product such as a product having a brand that is associated with the group shopping system (e.g., a partner brand of the service provider, merchant location, and/or the payment provider) or a brand that is associated with one or more of the users (e.g., a preferred brand provided by the user or determined based on a purchase history of the user to be preferred by the user). In this way, product makers and advertisers can enhance the visibility of their products with respect to products of other brands real time during the shopping experience of a shopper.

The age or other user characteristics of the at least one of the users may also be determined. In some embodiments, alerts provided at step 610 may be provided based on the determined user characteristics such as a determined age (e.g., a group shopping system may determine that an alert associated with an age-restricted product will not be provided to a user under a particular age and will be provided to a user that is at least that age).

At step 612, it may be determined that a product on the shopping list has been obtained by a user. For example, if the child takes the milk from the shelf, the system may determine that the milk has been obtained. As another example, if one of the parents picks up the motor oil from the shelf, the system may determine that the motor oil has been obtained. Determining that a product has been obtained may include receiving user provided information (e.g., when a user checks off a list item using their user device) or based on detected product movement (e.g., as determined via a communication between circuitry attached to or within the product or product packaging and one or more wireless beacons).

At step 614, the obtained item may be removed from the shopping list. For example, if it is determined that a child has obtained the milk, the milk may be removed from the shared shopping list At step 616, an updated copy of the stored shopping list (e.g., a copy without the removed items) may be provided to the users that are at the merchant location and/or users at other locations. In this way, for example, the parents of the child that has obtained the milk don't also take the time to look for and obtain the milk. Similarly, when one of the parents obtains the motor oil, the motor oil may be removed from the shared list so that other family members know that it has been obtained. It may also be determined when the last (or nearly the last) item on a shared shopping list has been obtained. Once the last item on the shared list is obtained, shoppers in the group may be notified, such as by store beacons, so that the group may start making their way to a checkout station or other meeting place. In other embodiments, a notification may be sent when the shopping list is almost completed, which may be useful in a very large store to give shoppers a more advanced notification.

Figure 7:
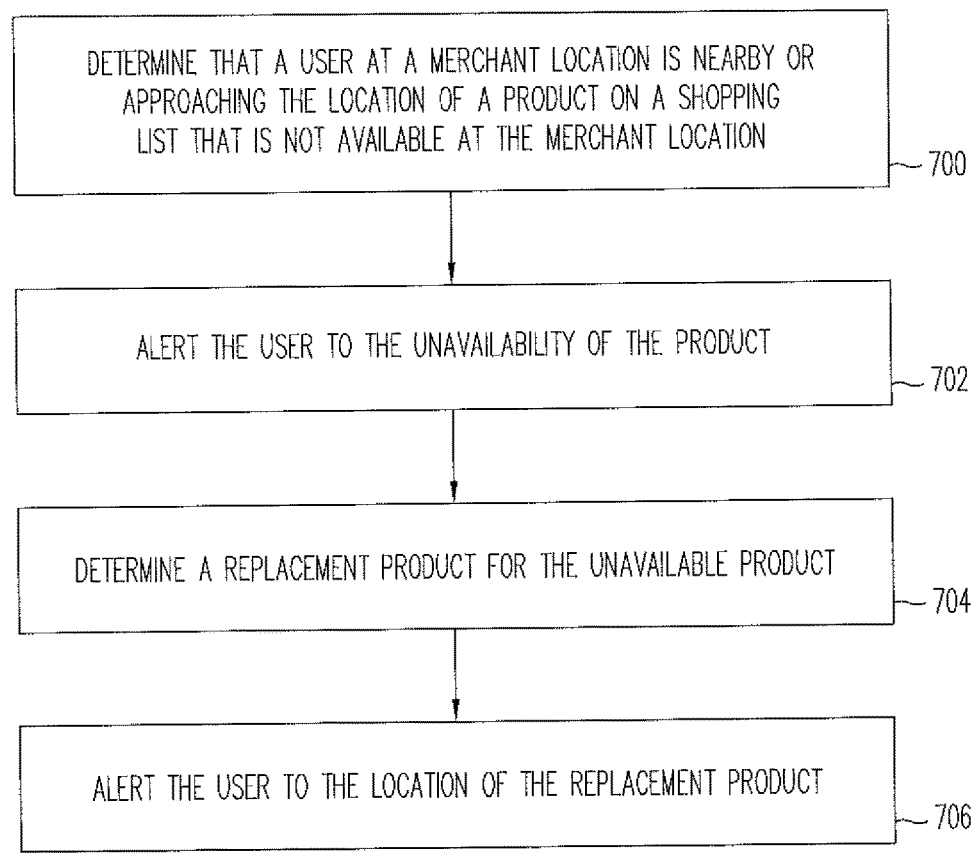
FIG. 7 is a flowchart of an exemplary process for identifying an unavailable product and alerting a user to a location of a replacement product, according to an embodiment.

In some situations, a desired item that is listed on a shopping list such as a shared shopping list may not be available at a particular merchant at a particular time. For example, a particular item may be out of stock, may not be available at that merchant location, or a preferred brand for the item (as examples) may not be available while the users are at the merchant location. In situations in which list items are not available, a system for facilitating group shopping may assist the users in obtaining similar or replacement products. Illustrative steps that may be performed in providing assistance to users that desire unavailable products are shown in FIG. 7

At step 700, a system such as system 100 of FIG. 1 may determine (e.g., using one or more wireless beacons) that a user at a merchant location is nearby or approaching the location of a product on a shopping list (e.g., a shared shopping list) that is not available at the merchant location. For example, a shopper at a big box store may be approaching a home goods section to pick up and purchase a home goods product such as a rug, a mirror, artwork, furniture, or other item for the home that is listed on a shopping list for the user that is stored at, for example, a service location server or a payment server. The system may determine that the product that the user is approaching is unavailable (e.g., out of stock, not carried at that location, etc.).

At step 702, the user may be alerted to the unavailability of the product. For example, an alert may be provided to a mobile device of the user.

At step 704, the system may determine one or more replacement products for the unavailable product. The replacement product may be the same product made by a different manufacturer (e.g., a product of a different brand) or a similar product. The replacement product may be determined based on information specific to the user or a group associated with the shopping list. For example, a replacement product may be determined based on stored preferences of the user or group (e.g., preferences provided by the user or group and/or preferences learned by the system based on communications and/or purchases of the user) and/or a purchase history of the user or group. For example, if the user is approaching the location of a particular brand of laundry detergent that is unavailable, a replacement laundry detergent may be determined based a previous purchase of another brand of laundry detergent by the user or another member of the group or it may be determined that the user or another member of the group is interested in detergent with color-safe bleach and a replacement detergent of the same brand or another brand that includes color-safe bleach may be determined for the user.

At step 706, the user may be alerted to the location of the determined replacement product. For example, an alert may be provided to a mobile device of the user telling the user to "turn right", "keep going", "turn left", "turn around", "look right", "look left", "look up", "look down" or providing other directions from the user's current location to the location of the replacement product. If desired, other details of the replacement product may be provided in the location alert such as a comparison of the price or other features of the replacement product with the corresponding features of the unavailable product, advantages of the replacement product, coupons for the replacement product or other information or offers.

Figure 8:
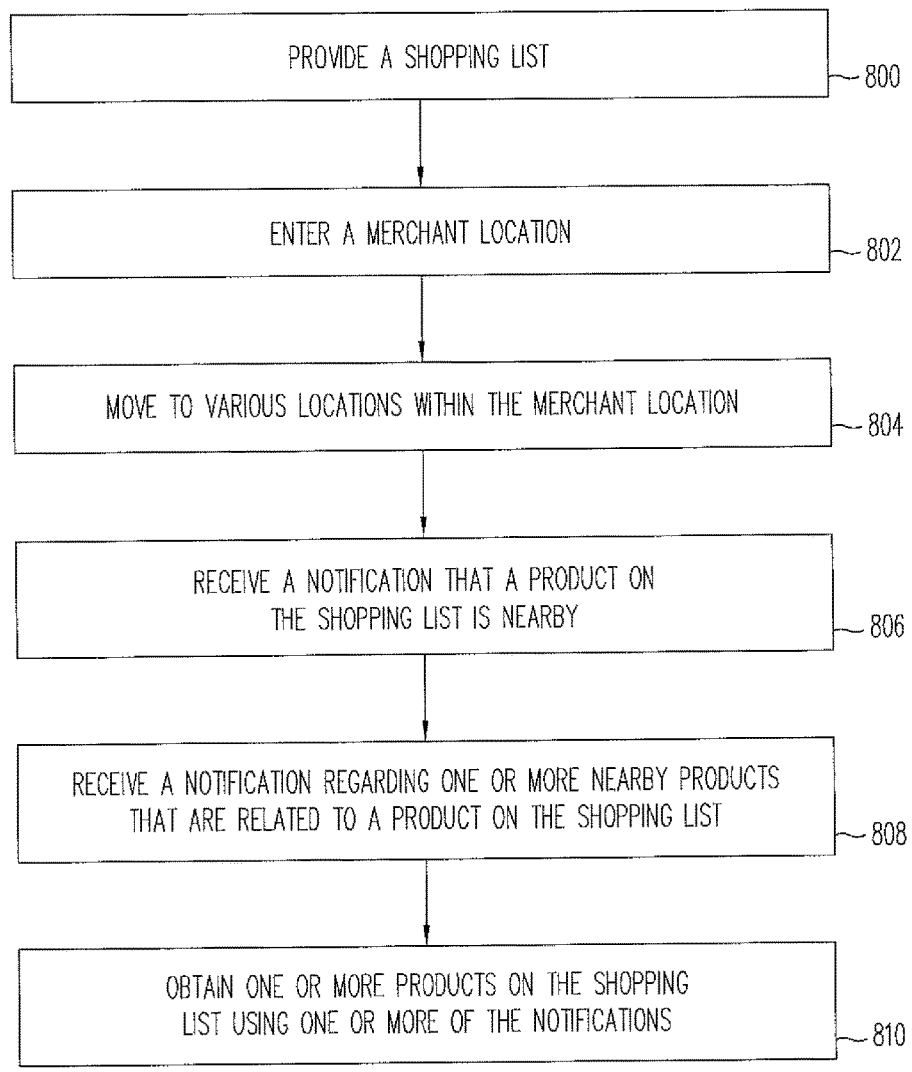
FIG. 8 is a flowchart of an exemplary process for using a group shopping system, according to an embodiment.

Illustrative steps that a user of a system such as system 100 may perform in an exemplary use ease are shown in FIG. 8.

At step 800, a user may provide a shopping list to a merchant, to a service provider, to a payment provider or other system entity. The user may provide the shopping list by entering or selecting items using an application on a user device, by adding items to a shopping list for future shopping by purchasing the items during a current shopping trip, or otherwise notifying a group shopping system of a desire or intent of the user to purchase a product. The shopping list may be a shared shopping list including items added by more than one user (e.g., by multiple members of a family or other group).

At step 802, one or more users associated with the provided shopping list may enter a merchant location. When the user(s) enter the merchant location, the users may be checked into the merchant location (e.g., when a user device of each user communicates with a wireless beacon at the merchant location).

At step 804, each user may move to various locations within the merchant location. For example, the user may walk or drive around the merchant location, picking up items on the list, other items, or simply browsing for potential items for purchase.

At step 806, while the user is moving to the various locations, the user may receive a notification that a product on the shopping list is nearby. The notification may be provided on a mobile device of the user and may indicate the location of the nearby shopping list item and/or provide directions to the nearby shopping list item.

At step 808, while the user is moving to the various locations, the user may receive a notification regarding one or more nearby products that are related to a product on the shopping list (e.g., a replacement product or a merchant recommended product such as a promotional or sale item).

At step 810, the user may obtain one or more products on the shopping list using one or more of the notifications. For example, the user may follow the directions provided in the notification to the location of each item on the shopping list and, if desired, the related items, and place the items in a shopping cart or otherwise obtain and purchase the items.

One or more of the processes and steps described in connection with FIGS. 6, 7, and 8 may be performed in any suitable order, omitted, and/or repeated any suitable number of times for facilitating efficient group shopping and associated processes.

Figure 9:
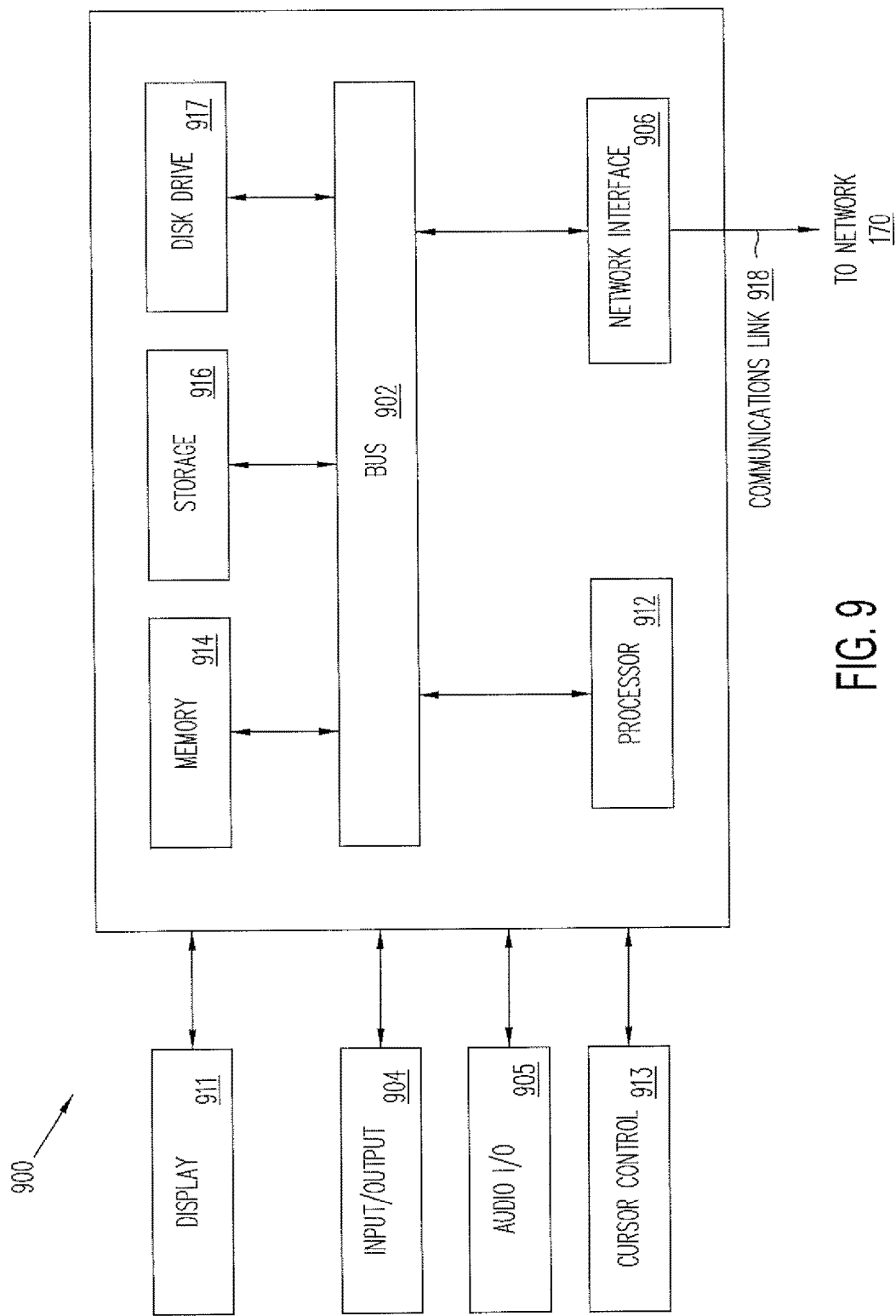
FIG. 9 is a block diagram of a computer system suitable for implementing one or more components in FIG. 1, according to an embodiment.

FIG. 9 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons, image, or links, and/or moving one or more images, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant device, or a service provider server via network 170. In one embodiment, the transmission is wireless, although other transmission mediums and methods may also be suitable. One or more processors 912, which can be a micro-controller, digital signal processor (DSP), or other processing component, processes these various signals, such as for display on computer system 900 or transmission to other devices via a communication link 918. Processor(s) 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor(s) 912 and other components by executing one or more sequences of instructions contained in system memory component 914. Logic may be encoded in a computer readable medium, which may refer to any medium that participates in providing instructions to processor(s) 912 for execution. Such a medium may take many forms, including but not limited to, non-volatile media, volatile media, and transmission media. In various embodiments, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. A non-transitory computer-readable medium may include instructions which, in response to execution by a computer system, cause the computer system to perform some or all of one or more methods as described herein. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A non-transitory machine-readable medium having stored thereon machine-readable instructions executable to cause a machine to perform operations comprising:

automatically generating, by a service provider, a list of products available at a merchant establishment based on account information for a plurality of user accounts associated with a plurality of user devices, wherein the account information comprises recommended items based on historical user information corresponding to one or more of the plurality of user accounts;

receiving from the plurality of user devices within the merchant establishment, user device check-in information for each of the plurality of user devices, wherein the user device check-in information is generated based on first wireless communications between beacons installed within the merchant establishment and the plurality of user devices;

determining that the plurality of user devices correspond to a group associated with the list of products based on the account information;

determining a first location, within the merchant establishment, at which a first product from the list of products displayed in a software application running on the plurality of user devices is located, wherein the list of products is shared between each of the plurality of user devices;

determining that a first user device from the plurality of user devices is within a first predefined proximity to the first location using wireless signals transmitted by at least one of the beacons over the first predefined proximity;

causing to be displayed, in an interface of a software application running on the first user device, only a portion of the list of products based on the first user device being within the first predefined proximity of the first location using the wireless signals, wherein the portion of the list of products is based on a location of the first user device in the merchant establishment;

determining that a first user associated with the first user device obtained the first product based on second wireless communications between the first user device and a beacon associated with the first location;

causing an update to indicate that the first product has been obtained on each of the plurality of user devices;

transmitting a product alert for a second product in the list of products;

determining that the first user device leaves a second predefined proximity for the second product based on the first user device and the beacons; and removing the product alert from the interface of the software application running on the first user device.

2. The non-transitory machine-readable medium of claim 1, wherein the operations further comprise:

presenting, based in part on determining that the first user device is within the first predefined proximity to the first location, a proximity alert on the first user device to indicate that the first user is within the first predefined proximity to the first product.

3. The non-transitory machine-readable medium of claim 1, wherein the operations further comprise:

determining that products specified in the software application have been obtained; and presenting an exit alert on the plurality of user devices.

4. The non-transitory machine-readable medium of claim 1, wherein the determining that the first user device is within the first predefined proximity to the first location is based on the wireless signals between the first user device and two or more of the beacons.

5. The non-transitory machine-readable medium of claim 1, wherein the operations further comprise:

determining a third product from the list of products is unavailable at the merchant establishment; and presenting, using the software application running on the first user device, a replacement product for the third product.

6. The non-transitory machine-readable medium of claim 5, wherein the operations further comprise:

presenting a proximity alert on the first user device to indicate that the first user is within the first predefined proximity to the replacement product.

7. The non-transitory machine-readable medium of claim 1, wherein the group is further formed based on characteristics of users associated with the plurality of user accounts.

8. A system comprising:

a non-transitory memory; and one or more hardware processors coupled to non-transitory memory and configured to read instructions from the non-transitory memory to cause the system to perform operations comprising:

automatically generating, by a service provider, a list of products available at a merchant establishment based on account information for a plurality of user accounts associated with a plurality of user devices, wherein the account information comprises recommended items based on historical user information corresponding to one or more of the plurality of user accounts;

receiving from the plurality of user devices within the merchant establishment, user device check-in information for each of the plurality of user devices, wherein the user device check-in information is generated based on first wireless communications between beacons installed within the merchant establishment and the plurality of user devices;

determining that the plurality of user devices correspond to a group associated with the list of products based on the account information;

determining a first location, within the merchant establishment, at which a first product from the list of products displayed in a software application running on the plurality of user devices is located, wherein the list of products is shared between each of the plurality of user devices;

determining that a first user device from the plurality of user devices is within a first predefined proximity to the first location using wireless signals transmitted by at least one of the beacons over the first predefined proximity;

causing to be displayed, in an interface of a software application running on the first user device, only a portion of the list of products based on the first user device being within the first predefined proximity of the first location using the wireless signals, wherein the portion of the list of products is based on a location of the first user device in the merchant establishment;

determining that a first user associated with the first user device obtained the first product based on second wireless communications between the first user device and a beacon associated with the first location;

causing an update to indicate that the first product has been obtained on each of the plurality of user devices;

transmitting a product alert for a second product in the list of products;

determining that the first user device leaves a second predefined proximity for the second product based on the first user device and the beacons; and removing the product alert from the interface of the software application running on the first user device.

9. The system of claim 8, wherein the operations further comprise:

presenting, based in part on determining that the first user device is within the first predefined proximity to the first location, a proximity alert on the first user device to indicate that the first user is within the first predefined proximity to the first product.

10. The system of claim 8, wherein the operations further comprise:

determining that products specified in the software application have been obtained; and presenting an exit alert on the plurality of user devices.

11. The system of claim 8, wherein the determining that the first user device is within the first predefined proximity to the first location is based on the wireless signals between the first user device and two or more of the beacons.

12. The system of claim 8, wherein the operations further comprise:

determining a third product from the list of products is unavailable at the merchant establishment; and presenting, using the software application running on the first user device, a replacement product for the third product.

13. The system of claim 12, wherein the operations further comprise:

presenting a proximity alert on the first user device to indicate that the first user is within the first predefined proximity to the replacement product.

14. The system of claim 8, wherein the group is further formed based on characteristics of users associated with the plurality of user accounts.

15. A method comprising:

automatically generating, by a service provider, a list of products available at a merchant establishment based on account information for a plurality of user accounts associated with a plurality of user devices, wherein the account information comprises recommended items based on historical user information corresponding to one or more of the plurality of user accounts;

receiving from the plurality of user devices within the merchant establishment, user device check-in information for each of the plurality of user devices, wherein the user device check-in information is generated based on first wireless communications between beacons installed within the merchant establishment and the plurality of user devices;

determining that the plurality of user devices correspond to a group associated with the list of products based on the account information;

determining a first location, within the merchant establishment, at which a first product from the list of products displayed in a software application running on the plurality of user devices is located, wherein the list of products is shared between each of the plurality of user devices;

determining that a first user device from the plurality of user devices is within a first predefined proximity to the first location using wireless signals transmitted by at least one of the beacons over the first predefined proximity;

causing to be displayed, in an interface of a software application running on the first user device, only a portion of the list of products based on the first user device being within the first predefined proximity of the first location using the wireless signals, wherein the portion of the list of products is based on a location of the first user device in the merchant establishment;

determining that a first user associated with the first user device obtained the first product based on second wireless communications between the first user device and a beacon associated with the first location;

causing an update to indicate that the first product has been obtained on each of the plurality of user devices;

transmitting a product alert for a second product in the list of products;

determining that the first user device leaves a second predefined proximity for the second product based on the first user device and the beacons; and removing the product alert from the interface of the software application running on the first user device.

16. The method of claim 15, further comprising:

presenting, based in part on determining that the first user device is within the first predefined proximity to the first location, a proximity alert on the first user device to indicate that the first user is within the first predefined proximity to the first product.

17. The method of claim 15, further comprising:

determining that products specified in the software application have been obtained; and presenting an exit alert on the plurality of user devices.

18. The method of claim 15, wherein the determining that the first user device is within the first predefined proximity to the first location is based on the wireless signals between the first user device and two or more of the beacons.

19. The method of claim 15, further comprising:

determining a third product from the list of products is unavailable at the merchant establishment; and presenting, using the software application running on the first user device, a replacement product for the third product.

20. The method of claim 19, further comprising:

presenting a proximity alert on the first user device to indicate that the first user is within the first predefined proximity to the replacement product.

* * * * *